April 9, 1946.   R. F. RENNIE   2,398,114
REDUCTION OF MOLYBDENUM TRIOXIDE
Filed Sept. 12, 1942
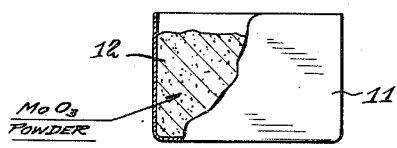
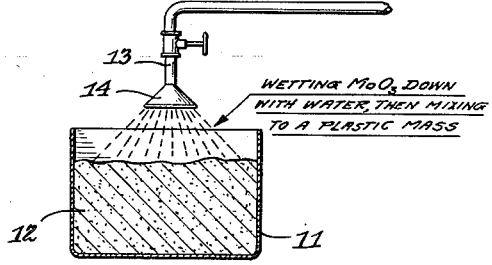
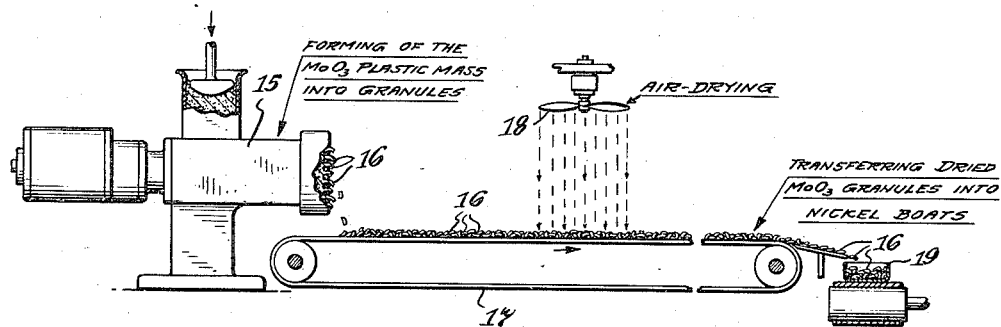
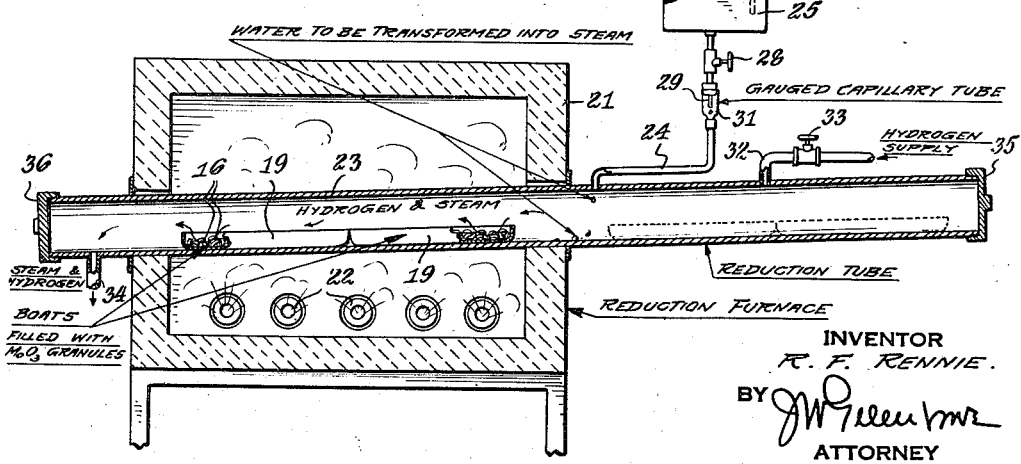
INVENTOR
R. F. RENNIE.
BY
ATTORNEY Patented Apr. 9, 1946

2,398,114

UNITED STATES PATENT OFFICE 2,398,114

REDUCTION OF MOLYBDENUM TRIOXIDE

Robert Fredrik Rennie, Little Falls, N. J., assignor to Westinghouse Electric Corporation, East Pittsburgh, Pa., a corporation of Pennsylvania Application September 12, 1942, Serial No. 458,106

22 Claims. (Cl. 75—84)

This application is a continuation-in-part of my application Serial No. 413,119, filed October 1, 1941, and owned by the assignee of the present application.

This invention relates to the manufacture of molybdenum, and more particularly to a method of reducing molybdenum trioxide for that purpose.

The principal object of my invention, generally considered, is the shortening and otherwise improving on the manufacture of molybdenum, starting with molybdenum trioxide, avoiding slow reduction due to keeping the reaction temperature low and/or flowing the reducing gas very slowly.

Another object of my invention is the reduction of molybdenum trioxide to molybdenum by one continuous process, while avoiding the production of imperfect or "cony" metal.

A further object of my invention is the reduction of molybdenum trioxide to molybdenum by heating in a reducing gas diluted with an inert gas and/or gaseous reaction product so that the exothermic part of the reduction is slowed down to such an extent that the reaction temperature at no times rises much, that is more than about 50° C., above that due to the applied heat, increasing the strength and/or flow of reducing gas when the reduction to molybdenum dioxide is nearly complete, raising the temperature and holding until reduction to molybdenum is complete.

A still further object of my invention is the production of molybdenum directly from molybdenum trioxide by one continuous process comprising wetting down the molybdenum trioxide powder, mixing to a plastic mass, granulating as by passing through a meat grinder or the like, drying the granules, heating in a slow stream of hydrogen, carbon monoxide, ammonia, or other reducing gas or mixture, increasing the temperature, diluting said reducing gas and increasing its flow, cutting off the diluting material, further increasing the flow of reducing gas or increasing the reducing power of the treating gas, raising the temperature, and holding at said higher temperature until reduction to molybdenum is complete.

An additional object of my invention is the control of the process of reducing molybdenum trioxide by pressure variation.

Other objects and advantages of the invention, relating to the particular features and steps of the process, will become apparent as the description proceeds.

Referring to the drawing:

Fig. 1 is a side elevational view of a receptacle containing molybdenum trioxide powder, said receptacle being partly broken away and showing the trioxide powder.

Figure 2 is a vertical sectional view of the same receptacle showing the trioxide powder being wet down with water.

Figure 3 is a diagrammatic view showing apparatus for granulating and drying the plastic mass of wet molybdenum trioxide produced in accordance with Figure 2.

Figure 4 is a perspective view of a dry granule of molybdenum trioxide.

Figure 5 is a sectional view of a furnace and associated apparatus for reducing molybdenum trioxide to molybdenum.

Molybdenum trioxide ($MoO_3$) is normally a light powder readily reduced. It is changed first to molybdenum pentoxide ($Mo_2O_5$), which may be considered as a mixture of $MoO_3$ and $MoO_2$, then to molybdenum dioxide, then to molybdenum sesqui-oxide, $Mo_2O_3$, and then to molybdenum by a reducing gas, such as hydrogen. It is normally so fine, however, that it blocks the penetration of the reducing gas into the charge. In the beginning of a reduction, the outside layers are quickly changed and the hydrogen, or other reducing agent, will be diluted with plenty of steam, or other reaction product, formed during the reduction. As the reduction progresses, the reaction slows down because the hydrogen, or other reducing gas, has difficulty penetrating the outside layers, consequently little steam or other reaction product is formed. Therefore, when practically undiluted hydrogen strikes hot molybdenum trioxide, a "runaway" reaction is apt to take place with the formation of a core of "cony" metal in the charge.

Commercial molybdenum trioxide, as made by the Climax Molybdenum Company, for example, has been reduced using a double schedule in which the molybdenum dioxide obtained on the first reduction is screened and then mixed with molybdenum trioxide for a second reduction. Thus diluted with molybdenum dioxide, the mixture may reduce in an orderly fashion. A small percentage of ammonium chloride has also been added, apparently for the purpose of providing escaping vapors to form pathways for the reducing gas to enter.

In short, the direct reduction of molybdenum trioxide to the metal has, prior to my invention, not been satisfactorily accomplished on a production scale.

The first stage of the reduction of molybdenum trioxide to molybdenum, that is the change to $Mo_2O_5$ or $MoO_2$ is exothermic, with the possible generation of sufficient heat to carry the temperature of the adjacent unreduced molybdenum trioxide to the fusion point or sublimation point, either of which occurrences wastes material and/or interferes seriously with the physical state of the final molybdenum metal obtained.

Since control of the physical state is necessary for the fabrication of molybdenum by the method of powder metallurgy now in use, it is necessary to so regulate the reduction from molybdenum trioxide to molybdenum that substantially uniform molybdenum powder of controlled particle size is obtained. The control of particle size by reduction of molybdenum dioxide ($MoO_2$), or molybdenum pentoxide ($Mo_2O_5$) with hydrogen, to molybdenum affers no serious problems not already worked out. The main problem, therefore, resolves itself to a control of the reduction from molybdenum trioxide to $Mo_2O_5$ or $MoO_2$ or mixtures thereof.

The fusion point of molybdenum trioxide is about 795° C. but below this point it has a definite vapor pressure and sublimes rapidly enough to carry a substantial amount of oxide from one point to another. The problem, therefore, in reduction of molybdenum trioxide to molybdenum in the first stage, is to keep the maximum temperature of the zone in which reduction is taking place well below 795° C., or in the neighborhood of 680° C. This can be accomplished by diluting the reducing gas, which may be hydrogen, carbon monoxide, ammonia or mixtures of these, with or without traces of hydrocarbons, with a proportion of gas which will not react with the oxides of molybdenum at the temperatures used. A sufficient proportion of such a gas is used to control the reaction so that the heat given off is spread out over enough time to avoid undue increase of temperature, rather than being suddenly liberated. While 680° C. is indicated as the maximum temperature of reaction, yet slightly higher temperatures may be used with increased accuracy of control, but in view of the high vapor pressure of molybdenum trioxide near the melting point, such a temperature should not be closely approached, that is, the rise above 630° C. should not exceed 50° C.

The proportion of inert or reaction-reducing gas to the reducing gas required will depend upon the reducing gas and the diluting gas selected and can be determined either by calculation or by experiment. For example, it can be determined by inserting a pyrometer in the mass of molybdenum trioxide to be reduced at the first point of contact of the reducing gas and the oxide, and adjusting the mixture until the final temperature does not rise much above 680° C. when the furnace temperature is maintained at about 630° C., which is a temperature necessary to bring about a reasonably rapid reduction of molybdenum trioxide. Successful results have been obtained with hydrogen diluted with steam, and with mixtures of hydrogen and carbon monoxide diluted with nitrogen and carbon dioxide obtained from an "Endogas" furnace giving about 50% of reducing gases.

In accordance with my invention, I start with molybdenum trioxide in the form of powder as received from the producer, such as the Climax Molybdenum Company, but then preferably convert it into granules before reduction.

This helps the reducing gas penetration and is easily accomplished at very small expense. After granulation, the reduction is accomplished with hydrogen or other reducing gas, using admixed steam or inert gas in the early stages to prevent a runaway reaction.

Referring to the drawing in detail, like parts being designated by like reference characters, there is shown in Figure 1 a receptacle 11 containing a quantity of molybdenum trioxide powder 12 in the form in which it is received from the producer.

In accordance with Figure 2, this powder is wet down with water from pipe 13 and spray nozzle 14, mixed to a plastic mass, and then put through a granulating machine 15, as shown in Figure 3. This machine may be like a meat grinder so that the molybdenum trioxide emerges in the form of granules 16. These granules may be dried in any desired manner, as by being held on a rack at moderate temperature for twenty-four hours, or dropped on an endless belt 17 which passes under air-drying means, such as an electric fan 18. It is finally discharged into boats 19 formed of relatively refractory metal such as nickel.

In Figure 5 there is shown a furnace 21 which, in the present instance, is fired by gas burners 22, although other heating means may be employed if desired. Through the furnace runs a slightly inclined reduction tube 23, which may be of 4 inches internal diameter and formed of relatively refractory material such as nichrome. Connected to said tube exterior of the furnace is a pipe 24 by means of which water may be introduced for the formation of steam. The water is supplied to the pipe 14 from a reservoir 25 and kept at a desired level by a float valve 26 in the water supply pipe 27. The flow of the water from the reservoir is controlled by a valve 28 admitting water through gauged capillary tube 29 into a transparent connection 31 permitting observation of the flow of water.

The hydrogen supply passes to the reduction tube 23 thru pipe 32 controlled by valve 33. The exhaust from the reduction tube passes out through relatively small pipe 34, which may be connected to the hydrogen supply line to salvage hydrogen unused in the furnace, after condensation of the steam therefrom. The ends of the tube 23 are normally closed by caps 35 and 36.

I will now describe a preferred production schedule of molybdenum trioxide to molybdenum, preferably using the granulated material, the manufacture of which has been described, although I do not wish to be limited to such use. It will also be understood that the schedule is merely illustrative and changes may be made within the broad scope of my invention.

The preferably granulated molybdenum trioxide ($MoO_3$) is placed in boats 19, desirably formed of refractory metal such as nickel, preferably about 2 kilograms per boat, the material being spread out in the boats to expose as much surface as possible.

As illustrated in Figure 5, the boats are desirably of a size such that when positioned, as shown in full lines, they extend from one end to the other of the heated portion of the reduction tube 23. The filled boats may be first introduced into the cold or right hand end portion of the tube, after removal of the cap 35, and pushed into the furnace to the position illustrated in full lines.

Considering that the operation starts with the reduction tube at a temperature of about 180° C., the temperature is raised over a period of one-half hour to about 430° C., during which time a slow stream of hydrogen is emitted from the pipe 32. The hydrogen preferably passes at the rate of 15 cu. ft. per hour.

The reduction of the molybdenum trioxide to molybdenum dioxide starts at about 300° C. and by the time the furnace is up to this temperature the tube 23 is filled with hydrogen. The reaction is in accordance with the following formula:

$MoO_3 + H_2 = MoO_2 + H_2O +$ 29.7 Kg. calories per gr. mol.

The temperature of the reduction tube is then increased from about 430° C. to about 630° C. over a period of about one hour, water being admitted from the pipe 24, preferably at the rate of six cu. cm. per minute, to produce steam to slow down the reaction, and the hydrogen flow is increased to preferably 30 cu. ft. per hour, so that the charge near the entrance end will not react with all but will leave some for the rest of the charge.

After operating at this temperature for about two hours, the reduction of the molybdenum trioxide to the dioxide is nearly complete, so that the water may be shut off and the flow of hydrogen increased to about fifty cubic feet per hour.

After further operation for another quarter hour, the temperature of the reduction tube is gradually increased so that it reaches about 1040° C. in about 1¾ hours. It is kept at this increased temperature for about 3½ hours more, after which all the charge should be converted to metallic molybdenum and the process is complete.

The foregoing may be summarized by the following table:

| Hours | O'clock | Furnace temp. | |
|---|---|---|---|
| 0 | 8:00 | 180° C | 15 cu. ft. H₂ per hr. |
| ½ | 8:30 | 430° C | 6 cc. H₂O per min. 30 cu. ft. H₂ per hr. |
| 1½ | 9:30 | 630° C | |
| 3½ | 11:30 | 630° C | Reduction to MoO₂ nearly complete—water off—50 cu. ft. H₂ per hr. |
| 3¾ | 11:45 | Raise | |
| 5½ | 1:30 | 1040° C | |
| 9 | 5:00 | Off | Remainder of MoO₂ reduced to Mo. |

From the foregoing it will be seen that I have not only shortened the schedule to nine hours and eliminated the formation of clinkers or cones, but I have made it possible to reduce from trioxide form to the metal in one continuous process, as well as salvaging nearly all of the unused hydrogen passed through the furnace.

In order to convert an old furnace to one which may be used for practicing my invention, it is merely necessary to tilt the same, or the reduction tube thereof, toward the exit end and provide for a water connection such as described.

Although I have described the reduction to molybdenum dioxide by hydrogen, it will be understood that this may be effected by some other reducing gas. This will be clear from considering the following equations, which like that for the reduction of molybdenum trioxide by hydrogen may represent such a reduction by other agents.

$MoO_3 + CO = MoO_2 + CO_2 +$ 31.8 Kg. calories per gr. mol.

$MoO_3 + \frac{2}{3}NH_3 = MoO_2 + H_2O + \frac{1}{3}N_2 +$ 21.6 Kg. calories per gr. mol.

The foregoing, like the preceding equation with regard to the reduction of molybdenum trioxide by hydrogen, will show the necessity for diluting means at high temperature in order to control the reaction so that the heat given off is spread over such a time interval that no undesired rise in temperature occurs. Steam or other reaction product is favored because it not only acts as a diluent but affects the point of equilibrium of the reaction, according to the well-known law of mass action discovered by Guldberg-Waage. Carbon dioxide, nitrogen or other gas inert with regard to the materials in the furnace may be employed.

Instead of using an unmixed gas, such as hydrogen, for reducing purposes, a mixture of gases, assuming a large enough reducing proportion, may be used. Thus 3.4:1 air-gas ratio "Endogas" that gives approximately 50% of reducing gases may be employed. The analysis of such a gas is as follows:

| | Percent |
|---|---|
| $O_2$ | 0.0 |
| $CO_2$ | 1.5 |
| $H_2$ | 36.0 |
| CO | 14.0 |
| $CH_4$ | 1.3 |
| $N_2$ | Balance |

The foregoing gas has been used successfully in reducing molybdenum trioxide to molybdenum without getting any "cony" material.

Referring to Peck's article in the June 1942 issue of "Metals Progress," page 814, it will be seen that the composition of Endogas can be varied from highly reducing to practically neutral.

It is entirely feasible to use the highly reducing mix labeled "Mark No. 3" in chart on page 815, ibid., for reduction of $MoO_3$. This gas contains 41.7% $N_2$, and has approximately the same reducing qualities as of 30 ft. $H_2$ per hour when mixed with 6 cc. $H_2O$ per min., which gas contains about 36% $H_2O$. This is the gas composition that is used in the critical stage of the hydrogen-steam reduction. A schedule using "Endogas," starting with 50% and ending with 57% or "Mark No. 3" "Endogas," follows:

*Schedule (same furnace)*

| Hours | O'clock | Furnace temp. | Flow per hr. |
|---|---|---|---|
| 0 | 8:00 | 180° C | 15 cu. ft. 50% "Endogas." |
| ½ | 8:30 | 430° C | 30 cu. ft. 50% "Endogas." |
| 1½ | 9:30 | 630° C | |
| 3½ | 11:30 | 630° C | 50 cu. ft. 50% "Endogas." |
| 3¾ | 11:45 | Raise | 65 cu. ft. 57% "Endogas." |
| 5½ | 1:30 | 1040° C | 65 cu. ft. 57% "Endogas." |
| 9 | 5:00 | Off | 65 cu. ft. 57% "Endogas." |

It will be understood that in place of a reducing agent such as ammonia, "Endogas," etc., throughout the whole schedule, it is desirable to finish the reduction with the employment of pure hydrogen during the last hour. Other highly reducing gas such as water gas may be used instead of "Endogas," in which case also it is desirable to use hydrogen during the last period of reduction.

It may be queried whether the employment of "Endogas" or other mixture or compound, which contains a large proportion of nitrogen will result in the formation of any substantial percentage of molybdenum nitride. A sample of the molybdenum produced with "Endogas" was heated with fused potassium hydroxide and no smell of ammonia could be perceived, thereby indicating that the amount of nitride in the metal is very small. According to the literature, 2 cc. of nitrogen is dissolved by 100 grams of molybdenum at 800° C., which would be about .00025%.

It will also be understood that although I have described the use of steam for slowing down the reducing action of hydrogen, yet any inert gas, such as nitrogen or carbon dioxide, may be employed for the purpose. If ammonia is initially used as a reducing gas, no diluting gas may be necessary as the heat generated during the reaction is not only less but the hydrogen obtained by the cracking of the ammonia is diluted with uncracked ammonia.

It will be noted that in accordance with the formula for reducing by ammonia, the volume of the gases involved doubles during the reaction so that, according to the well-known LeChatelier principle, said reaction can be controlled by pressure. In other words, such a reaction may be effected in a closed vessel with pyrometer means showing the temperature of the reaction. If the operator notes that the reaction temperature tends to become excessive, he can immediately increase the pressure, thereby slow up the reaction, and prevent the temperature getting above that desired.

Although preferred embodiments of my invention have been disclosed, it will be understood that modifications may be made within the spirit and scope of the invention as defined by the appended claims.

I claim:

1. The method of reducing comprising heating molybdenum trioxide in a reducing gas, diluting said gas with an inert gas, shutting off the inert gas when the reduction to molybdenum dioxide is nearly complete, and continuing the heating in said reducing gas until reduction to molybdenum is complete.

2. The method of reducing comprising heating molybdenum trioxide in a reducing gas, diluting said gas with an inert gas, increasing the temperature, shutting off the inert gas when the reduction to molybdenum dioxide is nearly complete, raising the temperature, and holding at said increased temperature until reduction to molybdenum is complete.

3. The method of reducing comprising heating molybdenum trioxide in a slow stream of reducing gas, increasing the temperature and flow of and diluting said reducing gas with inert gas, shutting off said inert gas when the reduction to molybdenum dioxide is nearly complete, further increasing the flow of reducing gas, and holding until the reduction to molybdenum is complete.

4. The method of reducing comprising heating molybdenum trioxide in a slow stream of reducing gas, diluting said stream with inert gas, increasing the flow of said reducing gas, increasing the temperature, shutting off said inert gas when reduction to molybdenum dioxide is nearly complete, further increasing the flow of reducing gas, raising the temperature, and holding at said increased temperature until the reduction to molybdenum is complete.

5. The method of reducing comprising heating molybdenum trioxide in hydrogen, increasing the flow of and diluting said hydrogen, with inert gas, shutting off the inert gas when the reduction to molybdenum dioxide is nearly complete, and holding until the reduction to molybdenum is complete.

6. The method of reducing comprising heating molybdenum trioxide in a slow stream of hydrogen, diluting said hydrogen with an inert gas, increasing the flow of said hydrogen, increasing the temperature, shutting off the inert gas when reduction to molybdenum dioxide is nearly complete, further increasing the flow of hydrogen, raising the temperature, and holding at said increased temperature until the reduction to molybdenum is complete.

7. The method of reducing comprising heating molybdenum trioxide in hydrogen, increasing the flow of and diluting said hydrogen with steam, shutting off the steam when the reduction to molybdenum dioxide is nearly complete, and holding until reduction to molybdenum is complete.

8. The method of reducing comprising heating molybdenum trioxide in a slow stream of hydrogen, diluting said hydrogen with steam, increasing the flow of said hydrogen, increasing the temperature, shutting off the steam when reduction to molybdenum dioxide is nearly complete, further increasing the flow of hydrogen, raising the temperature, and holding at said increased temperature until reduction to molybdenum is complete.

9. The method of reducing comprising heating molybdenum trioxide from about 180° C. to about 430° C. in a slow stream of hydrogen, increasing the temperature and flow of hydrogen while admitting steam to prevent too rapid a reaction, cutting off the steam after the reduction has progressed sufficiently so that no runaway reaction will occur, increasing the flow of hydrogen and raising the temperature until substantially all has been reduced to molybdenum.

10. The method of reducing comprising heating molybdenum trioxide in hydrogen, increasing the flow of hydrogen, diluting with steam, increasing the temperature to about 630° C., cutting off the steam after reduction has progressed sufficiently so that nearly all the trioxide has been reduced to dioxide and no runaway reaction will occur, and raising the temperature and holding the material at such temperature until substantially all has been reduced to molybdenum.

11. The method of reducing comprising heating molybdenum trioxide in hydrogen, admitting water to form steam to dilute said hydrogen and slow down the reaction, cutting off the water after reduction has progressed sufficiently so that nearly all the trioxide has been reduced to dioxide, and raising the temperature and holding at such temperature until substantially all the dioxide has been reduced to molybdenum.

12. The method of reducing comprising heating molybdenum trioxide in hydrogen flowing at the rate of about fifteen cubic feet per hour, increasing the temperature and the flow of hydrogen to about thirty cubic feet per hour while admitting steam to slow down the reaction forming molybdenum dioxide, cutting off the steam, and raising the temperature and holding the material at such temperature until substantially all the dioxide has been reduced to molybdenum.

13. The method of reducing comprising heating molybdenum trioxide in a relatively slow stream of hydrogen, increasing the temperature and the rate of hydrogen flow to about thirty cubic feet per hour, diluting said hydrogen with steam, cutting off the steam when the reduction to molybdenum dioxide is substantially complete, increasing the rate of hydrogen flow to about fifty cubic feet per hour, and raising the temperature and holding the material at such temperature until substantially all the dioxide has been reduced to molybdenum.

14. The method of reducing comprising heating molybdenum trioxide in hydrogen, increasing the temperature and hydrogen flow, while admitting steam until the reduction to molybdenum dioxide is nearly complete, cutting off the steam, increasing the flow of hydrogen, raising the temperature until it reaches about 1040° C., and holding at said temperature until substantially all the dioxide has been converted to molybdenum.

15. The method of reducing comprising mixing molybdenum trioxide powder with water, forming a plastic mass, granulating said mass, drying the granules, placing said granules in boats, heating in a reducing gas to start the reaction and effect partial reduction, and when the reduction to molybdenum dioxide is nearly complete increasing the strength of the gas employed and continuing the heating in said reducing gas until reduction to molybdenum is complete.

16. The method of reducing comprising wetting and granulating molybdenum trioxide, drying the granules, placing the same in boats, placing said boats in the reduction tube of a furnace, raising the temperature of said tube from about 180° C. to about 430° C. in a slow stream of hydrogen, increasing the flow of hydrogen diluted with steam, increasing the temperature to about 630° C. until the reduction to molybdenum dioxide is nearly complete, shutting off the steam, increasing the rate of hydrogen flow, raising the temperature until it reaches about 1040° C. and holding the material at said last-mentioned temperature until substantially all is converted to molybdenum.

17. The method of reducing molybdenum trioxide comprising forming the same into dry granules, placing about two kilograms thereof in each of two nickel boats, placing said boats in a reduction tube of a furnace, raising the temperature in said tube from about 180° C. to about 430° C. while passing hydrogen thereover at the rate of about fifteen cubic feet per hour, increasing the flow of hydrogen to about thirty cubic feet per hour while admitting water to said tube at the rate of about six cubic centimeters per minute to form steam for diluting the hydrogen, increasing the temperature to about 630° C. over a period of about an hour until the molybdenum trioxide has been nearly all reduced to the dioxide, shutting off the water, increasing the rate of hydrogen flow to about fifty cubic feet per hour, raising the temperature after another quarter of an hour of operation so that it reaches about 1040° C. in about one and three-quarter hours, and holding the material for about three and one-half hours more at said last-mentioned temperature so that all is converted into molybdenum.

18. The method of reducing comprising heating molybdenum trioxide in ammonia until nearly all is converted to molybdenum dioxide, and continuing the heating after substituting hydrogen for ammonia until the reduction to molybdenum is complete.

19. The method of reducing to molybdenum comprising heating molybdenum trioxide in a reducing gas diluted with at least one of the materials selected from the group consisting of an inert gas and a gaseous product of the reducing action, so that the exothermic part of the reduction is slowed down to such an extent that the reaction temperature at no time rises much above that due to the applied heat, substituting a stronger reducing gas when the reduction is partly effected, and continuing the heating in the substituted gas until reduction to molybdenum is complete.

20. The method of reducing comprising heating molybdenum trioxide in a mixture of hydrogen and carbon monoxide, so diluted that the exothermic part of the reduction to molybdenum is slowed down to such an extent that the reaction temperature at no time rises much above that due to the applied heat, only until the reduction to molybdenum dioxide is nearly complete, and then continuing the reduction to molybdenum in the mixture without such dilution.

21. The method of reducing comprising heating molybdenum trioxide in a reducing gas weak enough to slowly effect a partial reduction and when the reduction to molybdenum dioxide is nearly complete increasing the strength of the gas employed and continuing the heating until reduction to molybdenum is complete.

22. The method of reducing comprising heating molybdenum trioxide in ammonia and controlling the pressure during the reduction to molybdenum by increasing it where necessary to slow down the reaction so that the exothermic part thereof does not proceed rapidly enough to raise the temperature of the material being reduced much above that due to the applied heat.

ROBERT FREDRIK RENNIE.